Oct. 29, 1940.　　　F. H. HAGNER　　　2,219,990
ANGLE DETERMINING DEVICE
Filed April 13, 1938　　　2 Sheets-Sheet 1
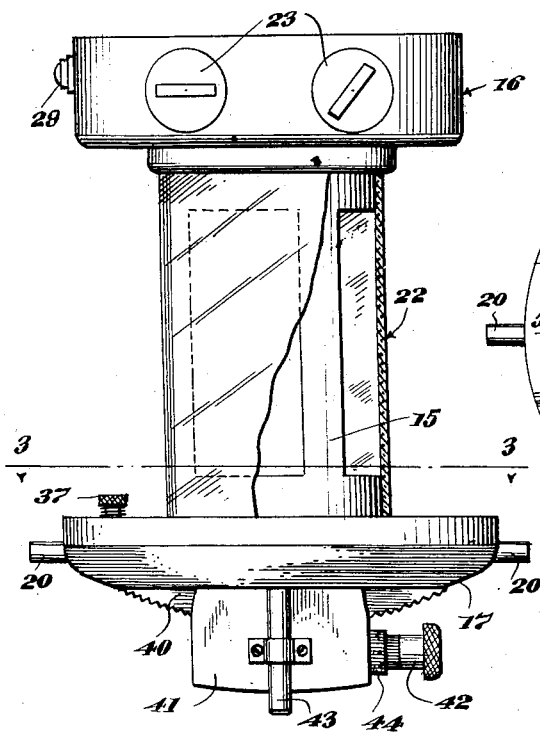
Fig. 1.
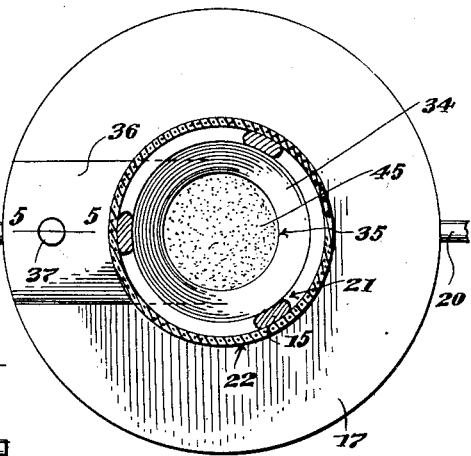
Fig. 3.
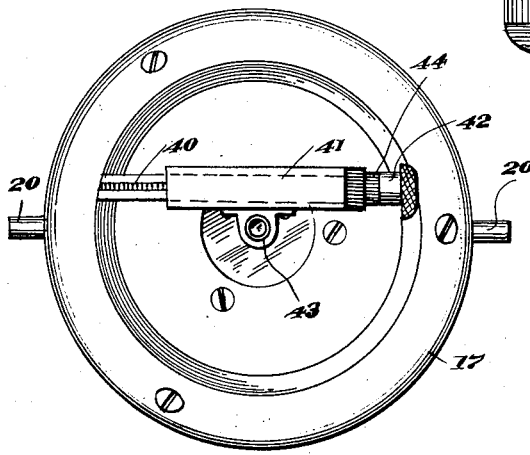
Fig. 2.
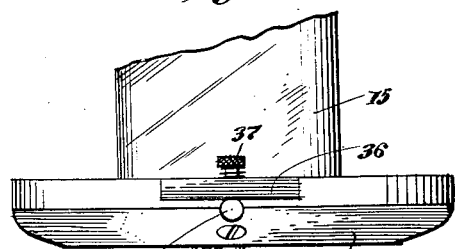
Fig. 4.
Fig. 5.
Inventor
FREDERICK H. HAGNER
By Irving A. McCathran
Attorney Oct. 29, 1940.  F. H. HAGNER  2,219,990
ANGLE DETERMINING DEVICE
Filed April 13, 1938  2 Sheets-Sheet 2
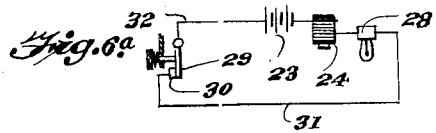
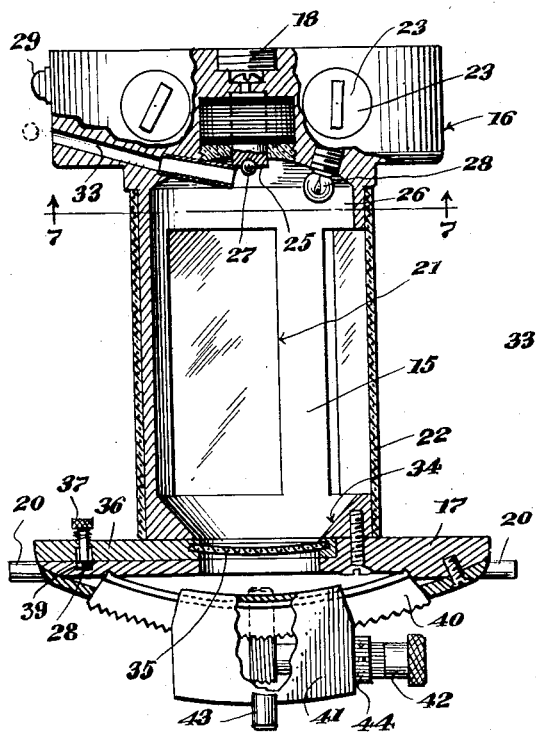
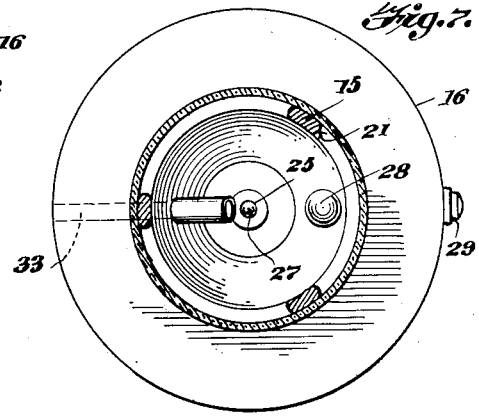
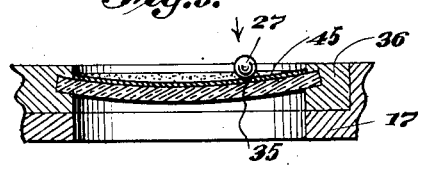
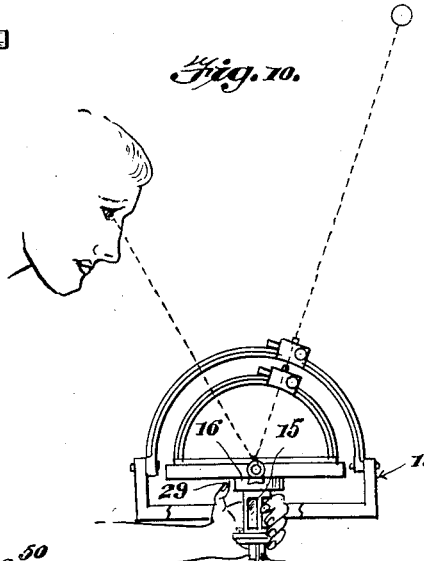
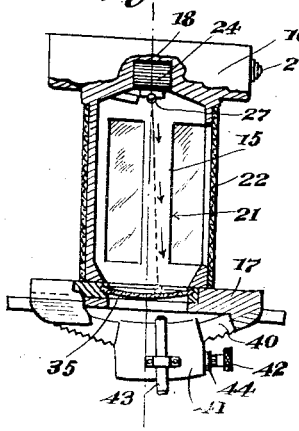
Inventor
FREDERICK H. HAGNER
By Irving A. M°Cathran
Attorney Patented Oct. 29, 1940

2,219,990

UNITED STATES PATENT OFFICE 2,219,990

ANGLE DETERMINING DEVICE

Frederick Hayes Hagner, San Antonio, Tex., assignor to Archbold-Hagner Instrument Laboratory, Inc., a corporation of Delaware Application April 13, 1938, Serial No. 201,846

10 Claims. (Cl. 33—206)

This invention relates to angle determining devices and has for one of its objects the production of a means for determining the angular position of a ship, plane and the like, at a given time with respect to a horizontal or vertical plane.

A further object of this invention is the production of a simple and efficient means for recording the angular position of a plane, ship, and the like, at a given time relative to a horizontal or vertical plane, whereby the readings while taking observations of celestial bodies and the like may be conveniently checked with the record of the angular position of the observation instrument at the time of observation to more accurately obtain a proper calculation as to an observer's position with respect to the body being observed.

A still further object of this invention is the production of a simple and efficient device for producing a permanent record of the angular position of the device with respect to the vertical and horizontal planes, at a given time.

Other objects and advantages of the present invention will appear throughout the following specification and claims.

In the drawings:

Figure 1 is a side elevational view of the angle determining device, certain parts being shown in section;

Figure 2 is a bottom plan view of the device shown in Figure 1;

Figure 3 is a horizontal sectional view taken on line 3—3 of Figure 1;

Figure 4 is a fragmentary side elevational view of the lower end of the device looking at right angles to Figure 1;

Figure 5 is a sectional view taken on line 5—5 of Figure 3;

Figure 6 is a vertical sectional view through the device, certain parts being shown in elevation;

Figure 6ª is a diagrammatic view of the electrical circuit for controlling the light and magnet carried by the device;

Figure 7 is a horizontal sectional view taken on line 7—7 of Figure 6;

Figure 8 is a transverse sectional view through a portion of the base, showing the recording plate in transverse section;

Figure 9 is a vertical sectional view partly in elevation showing the device in a tilted position;

Figure 10 is a side elevational view illustrating one typical manner in which the device may be used;

Figure 11 is a diagrammatic view of the electrical circuits used when the device is coupled with a time watch.

By referring to the drawings, it will be seen that 15 designates a casin which is provided with a head 16 and a base 17. The head 16 is provided with an internally threaded aperture 18 for facilitating the attachment of the device to the base of a position finder or other observation instrument such as is indicated in general by the numeral 19 in Figure 10. My angle determining device may be used in connection with the position finder shown in Figure 10, wherein the position finder is illustrated in general to the indicate a device such as is covered by my prior Patents #2,064,061 and #2,064,062, both issued December 15, 1936, and relating to Position finders and Navigating instruments, respectively. The present device, however, may be used in connection with other navigating instruments or mounted separately without departing from the spirit of the invention. I provide journals 20 extending laterally of the base 17, which journals may be connected to and supported upon gimbals to provide a universal mounting as is usual with such types of navigating instruments. The casing 15 is provided with a plurality of windows 21 and a suitable transparent covering 22 may be placed around the casing to close the openings 21 and at the same time permit the entrance of light and observation therethrough.

The head 16 carries a plurality of batteries 23 which are electrically connected to an electromagnet 24 mounted to extend vertically through the vertical center of the head 16, the battery 24 having a central core 25 extending into the upper end of the compartment 26 formed by the casing 15 whereby a ball 27 may be magnetically held in engagement with the end of the core 25 when the magnet 24 is energized. A light 28 is carried by the head 16 within the upper end of the compartment 26 adjacent the core 25 and may be electrically connected in series with the magnet 24, as is shown in the diagram in Figure 6ª. A normally closed push-button switch 29 is carried by the head 16, the switch 29 normally closing the contact 30 for completing the circuit through the wire 21 to the lamp 28, electro-magnet 24, battery 23, and back to the switch 29 through the wire 32. I also provide a suitable channel 33 of any suitable or desired type, whereby balls may be fed toward the core 25 whereby the ball, such as the ball 27, may be held in contact with the core 25 by the energization of the magnet 24.

The bottom end of the casing 15 is cone-shaped, as indicated at 34, the same converging toward the recording glass 35 which is preferably concavo-convex, the concave face facing in the direction of the magnet 24. This glass 35 closes the lower end of the casing 15 and is carried by a sliding frame 36, which frame 36 is slidably mounted through the base 17 whereby the recording glass 35 may be removed from the instrument when so desired. A spring-pressed pin 37 is carried by the frame 36. This pin 37 is provided with a threaded lower end 38 for fitting into the threaded socket 39 formed in the base 17 for locking the frame 36 in position.

An arc-shaped rack 40 is suspended below the base 17 and extends diametrically across the base in offset alignment with the transverse axis of the base and offset laterally with respect to the journals 20, as shown in Figure 2.

A housing 41 is suspended from the rack 40 and carries a vernier 42 which has threaded engagement with the rack 40. This housing 41 carries a magnifying lens telescope 43 extending in a vertical direction and normally in alignment with the central vertical axis of the casing 15 and the core 25, but the angular position of the telescope 43 may be changed and the angular movement may be read by consulting the vernier readings 44 of the conventional type. The glass 35 is provided upon its inner concave face with a thin film of wax coating 45.

The operation of the device is as follows:

A ball is fed through the passageway 33 whereupon the energized core 25 will cause the ball 27 to take the position shown in Figure 6. When the observation is made, or when it is desired to ascertain the angle which the plane, ship, and the like, has assumed at a certain time, the operator will push the push-button 29 de-energizing the magnet 24 thereby releasing the ball 27, which ball will fall through gravity in a direct line and make an impression upon the film coating 45 in a manner such as indicated in full line in Figure 8 and in dotted lines in Figure 9. As soon as the push-button 29 is released, the magnet 24 will be again energized and the light 28 will be illuminated. The instrument may then be swung at 180° or 360° allowing an observer to sight the point of contact of the ball 27 or the impression made upon the film 45 of the glass 35 through the telescope 34 and the reading on the vernier 44 will give the exact angle and the direction from the true vertical with respect to the vertical or horizontal plane which the instrument assumed when the observation was made or at the selected time when the ball 27 was released. The ball 27 will fall from the glass 35 towards the core 25 as the instrument is inverted and the energized core 25 will cause the ball 27 to be centered thereon, and if other balls are necessary or should it not be desired to invert the device, other balls may be fed through the channel 33. While the observation is being made, the light 28 will be illuminated thereby facilitating the reading upon the glass 35 through the telescope 43.

As shown in Figure 10, my device may be applied to the base of a position finder, as indicated by the numeral 19 and referred to in the above description, the manner of observation being illustrated in diagram. The casing 15 when attached to the position finder or observation instrument, may be gripped by the hand of the operator and when the proper observation is made the push-button 29 may be actuated to break the electrical circuit, thereby deenergizing the magnet 24 and dropping the ball 27 upon the film coating 45 of the glass 35, and recording an impression. The amount of variance from the normal center will determine the degree of the angle which the casing 15 assumes with respect to the vertical or horizontal plane and the position of the impression on the glass 35 may be viewed through the telescope 43 in the manner as described above.

In Figure 11, there is shown a modification of the invention wherein a normally closed switch is illustrated to be actuated by a push-button 47 similar to the push-button 29 for normally closed contact with the contact 48, the switch 46 and contact 48 being electrically connected to the electro-magnet 49 in a manner similar to that described with respect to Figure 6. A conventional type stop watch 50 may be associated with the apparatus and this may be actuated through the medium of an armature 51 which is adapted to be actuated by a relay 52 controlled through a contact 53 for energizing the magnet or relay 52, as the switch arm 46 is moved to a position to open the contact 48 and close the contact 43. This will cause the armature 51 to engage the stop watch 50 and cause the stop watch to stop simultaneously with the deenergization of the magnet 49 and in this way automatically recording the exact time when the angle test is taken.

As previously stated, the device is adapted to be mounted in the conventional type of gimbals, which will provide a universal joint support for the device, permitting the position of the device to be changed universally in the conventional manner without changing the azimuth reading, such for instance as when the device is used in conjunction with the position finder or navigating instrument 19.

It should be understood that the glass 35 necessarily must be of the correct radius with respect to the lower end of the core 25 and through the medium of the device illustrated and described, the angle of the tilt of the casing 15 with respect to the vertical or horizontal plane will be recorded by the release of the ball 27 preferably of metal, striking upon the thin film of wax or other material, the ball falling in a direct line from the core 25 to the plate 35, the plate 35 being of transparent glass. The ball when falling upon the thin film of wax, will cause a small indentation thereby recording the point where the ball struck the film of wax. Should the ball bounce, the other indentations made thereby will be exceedingly slight and the observer may easily select the proper impression. The small magnifying glass carried by the telescope 43 may be adjusted by the micrometer screw and vernier 42 and the exact reading may be obtained from the vernier reading 44. The present tilt indicator may be placed upon a plane or ship, or mounted in any desired or suitable manner for the purpose of recording the angle of tilt or checking the angular tilt with other instruments with which it may be associated. The present device may also be incorporated in any and all types of observing instruments where it is necessary to obtain a true horizontal or vertical reading.

One of the important advantages of the present device is the speed with which an observation may be made. The angle set on the instrument for an assumed altitude or position when observing any celestial body allows the observer to bring the image of the observed body to the cross hairs of the observation instrument and when the proper aligned sighting has been obtained, he merely releases the ball 27 and thereby obtains an accurate recording of the angle distance error to apply to the setting of his instrument. It is not necessary for the observer's eye, as is usual with other instruments, to follow a bubble or fast moving object.

When the recording and measuring device shows the instrument was tilted 20 minutes of arc in a certain direction, the observer may then adjust his instrument for the next observation to compensate for this angular tilt so that if he releases the ball when the body he was observing was properly sighted, the ball would fall in a true vertical line. If acceleration should be taking place while the ball was in space, the glass recorder or plate 35 would then be moving in a direction different than at the time when the ball was released, and this action would cause the ball to bounce and spin so that the point of striking of the ball the second time upon the wax coating 45 would be an indication that the first impression made by the ball was not a true one, and the observer should make another shot. However, a diagram might be easily made by the observer, whereby an approximate error could be known.

The push-button 29 may be located at any suitable or desired and convenient point with respect to the angle determining device, as will be obvious by considering the diagram in Figure 6a. This will permit the device to be used for determining the tilt of the bore of an oil well by lowering the same into the casing and locating the switch 29 at a convenient point for operation to release the ball 27. In this way the tilt of the bore of the well may be easily determined.

If desired, an electric photocell might be so used and positioned as to cause the magnet 24 to be automatically deenergized without the use of the switch 29 when a celestial object has been properly sighted upon an observing instrument. It has been found by actual experience that the time required for the ball 27 to fall upon the plate 35 and record the angle of tilt is about one-eleventh of a second, this being a great advantage when taking navigating observations.

Having described the invention, what is claimed is:

1. An angle-recording device of the class described comprising a casing, an electro-magnet carried at one end of the casing and adapted to carry a missile, a normally closed switch electrically connected to a source of electrical supply for normally maintaining the electro-magnet in an energized position whereby a missile will be held adjacent the magnet, and impression means carried by the opposite end of the casing upon which said missile is adapted to strike as said magnet is deenergized.

2. An angle-recording device of the class described comprising a casing, an electro-magnet carried at one end of the casing and adapted to carry a missile, a normally closed switch electrically connected to a source of electrical supply for normally maintaining the electro-magnet in an energized position whereby a missile will be held adjacent the magnet, impression means carried by the opposite end of the casing upon which said missile is adapted to strike as said magnet is deenergized, and means for facilitating the viewing of the impression means.

3. An angle-recording device of the class described comprising a casing, an electro-magnet carried at one end of the casing and adapted to carry a missile, a normally closed switch electrically connected to a source of electrical supply for normally maintaining the electro-magnet in an energized position whereby a missile will be held adjacent the magnet, impression means carried by the opposite end of the casing upon which said missile is adapted to strike as said magnet is deenergized, means for facilitating the viewing of the impression means, and illuminating means within the casing.

4. A device for recording the angle of tilt with respect to the vertical and horizontal planes comprising a casing, an electro-magnet carried at one end of the casing having a core located at the center of the casing, a normally closed switch, a source of electrical supply connecting the switch and magnet whereby the magnet will be normally energized, the switch being adapted to deenergize the magnet when actuated for breaking the circuit between the source of electrical supply and the magnet, a ball adapted to be normally held in magnetized contact with the end of said core, and impression means carried by the opposite end of the casing upon which the ball is adapted to strike for recording an impression to record the angle of tilt of the instrument.

5. A device of the class described comprising a casing, means for suspending a missile at one end of the casing, an impression medium comprising a transparent body with an impressible coating upon its inner face upon which the missile is adapted to strike when dropped from one end of the body in the direction of the impression means, means for facilitating the viewing of the impression means, and adjustable measuring means for measuring the variance between the normal center of gravity and the point of impression upon the impression means.

6. A device for measuring the angle of tilt with respect to the vertical and horizontal planes comprising a casing, means for suspending a ball in the upper end of the casing, a transparent glass carried at the lower end of the casing and having a thin film of wax upon its inner face whereby an impression may be made in the film of wax when the ball drops thereon, means for viewing the glass and impression thereon, and means for moving the glass and measuring the distance of movement to determine the relative variance between the normal center of gravity and the location of the impression whereby the angle of tilt may be accurately obtained.

7. A device for measuring the angle of tilt with respect to the vertical and horizontal planes comprising a casing, means for suspending a ball in the upper end of the casing, a transparent glass carried at the lower end of the casing and having a thin film of wax upon its inner face whereby an impression may be made in the film of wax when the ball drops thereon, means for viewing the glass and impression thereon, means for moving the glass and measuring the distance of movement to determine the relative variance between the normal center of gravity and the location of the impression whereby the angle of tilt may be accurately obtained, said means for moving the glass comprising a supporting rack and a micrometer screw engaging the rack.

8. A device for measuring the angle of tilt with respect to the vertical and horizontal planes comprising a casing, means for suspending a ball in the upper end of the casing, a transparent glass carried at the lower end of the casing and having a thin film of wax upon its inner face whereby an impression may be made in the film of wax when the ball drops thereon, means for viewing the glass and impression thereon, means for moving the glass and measuring the distance of movement to determine the relative variance between the normal center of gravity and the location of the impression whereby the angle of tilt may be accurately obtained, and a frame for supporting the glass slidably mounted within the casing and removable from the casing.

9. A device for measuring the angle of tilt with respect to the vertical and horizontal planes comprising a casing, means for suspending a ball in the upper end of the casing, a transparent glass carried at the lower end of the casing and having a thin film of wax upon its inner face whereby an impression may be made in the film of wax when the ball drops thereon, means for viewing the glass and impression thereon, means for moving the glass and measuring the distance of movement to determine the relative variance between the normal center of gravity and the location of the impression whereby the angle of tilt may be accurately obtained, a frame for supporting the glass slidably mounted within the casing and removable from the casing, and means for locking said frame upon the base.

10. A device of the class described comprising a casing, means for suspending a missile at one end of the casing, a recording means carried by the casing in spaced relation to the means for suspending a missile, means for releasing the missile to cause the missile to strike the recording means whereby the point of contact of the missile with the recording means may be preserved for observation by the operator, and means carried by the casing for moving the recording means and measuring the distance of movement to determine the relative variance between the normal center of gravity and the location of the point of contact of the missile whereby the angle of tilt may be accurately determined.

FREDERICK HAYES HAGNER.